United States Patent
Hiraoka et al.

(10) Patent No.: US 9,749,624 B2
(45) Date of Patent: Aug. 29, 2017

(54) MOVING IMAGE CODING APPARATUS AND MOVING IMAGE CODING METHOD

(71) Applicant: MegaChips Corporation, Osaka-shi (JP)

(72) Inventors: Takuya Hiraoka, Osaka (JP); Akira Okamoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1023 days.

(21) Appl. No.: 14/023,659

(22) Filed: Sep. 11, 2013

(65) Prior Publication Data

US 2014/0079120 A1    Mar. 20, 2014

(30) Foreign Application Priority Data

Sep. 19, 2012 (JP) .................................. 2012-205826

(51) Int. Cl.
*H04N 19/51* (2014.01)
*H04N 19/176* (2014.01)
(Continued)

(52) U.S. Cl.
CPC ..... *H04N 19/00587* (2013.01); *H04N 19/107* (2014.11); *H04N 19/14* (2014.11); *H04N 19/176* (2014.11)

(58) Field of Classification Search
CPC ........... H04N 19/00587; H04N 19/107; H04N 19/114; H04N 19/14; H04N 19/176
(Continued)

(56) References Cited

U.S. PATENT DOCUMENTS

| 7,020,203 B1 | 3/2006 | Horowitz et al. |
| 2006/0056519 A1 | 3/2006 | Horowitz et al. |

(Continued)

FOREIGN PATENT DOCUMENTS

| JP | 7199559085 A | * | 6/1994 |
| JP | 7-59085 A | | 3/1995 |

(Continued)

OTHER PUBLICATIONS

Japanese Office Action issued Apr. 19, 2016 in Patent Application No. 2012-205826 (with English language translation).
"7-1 compressed code", Japan Patent Office, Reference Room, http://www.jpo.go.jp/shiryou/s_sonota/hyoujun_gijutsu/nle/nle-7-1.html, ( with Japanese and English translation). accessed on Aug. 13, 2012, 11 pages.

*Primary Examiner* — William C Vaughn, Jr.
*Assistant Examiner* — Joseph A Towe
(74) *Attorney, Agent, or Firm* — Oblon, McClelland, Maier & Neustadt, L.L.P.

(57) ABSTRACT

Moving images are coded with reduced deterioration in the image quality while variations in the amount of code per frame are being reduced. A moving image coding apparatus includes a remaining picture number obtaining unit, an activity calculation unit, an intra MB determination unit, and a coding unit. The remaining picture number obtaining unit detects the temporal position of the current frame image, and determines the reset timing at which an intra refresh process is reset in a manner that the reset timing differs for each macroblock line (MBL). The activity calculation unit calculates an activity value for each macroblock (MB). The intra MB determination unit determines a MB to be set as an intra MB based on the activity value calculated by the activity calculation unit. The coding unit codes the MB set as an intra MB through an intra coding process.

11 Claims, 10 Drawing Sheets

(51) Int. Cl.
*H04N 19/107* (2014.01)
*H04N 19/14* (2014.01)

(58) Field of Classification Search
USPC .................................................. 375/240.12
See application file for complete search history.

(56) References Cited

U.S. PATENT DOCUMENTS

| | | | |
|---|---|---|---|
| 2010/0189184 A1* | 7/2010 | Yamaguchi | H04N 19/176 375/240.29 |
| 2012/0294361 A1 | 11/2012 | Hasegawa et al. | |
| 2012/0308151 A1 | 12/2012 | Tatsuka et al. | |
| 2012/0321207 A1 | 12/2012 | Hasegawa et al. | |

FOREIGN PATENT DOCUMENTS

| | | | |
|---|---|---|---|
| JP | 2004-215252 | | 7/2004 |
| JP | 2006-94081 A | | 4/2006 |
| JP | 2006094081 A | * | 4/2006 |
| JP | WO2009044475 | * | 9/2009 |
| JP | 2011-155543 | | 8/2011 |
| JP | 2011-166512 | | 8/2011 |
| JP | 2011166512 A | * | 8/2011 |
| JP | 2011-188022 | | 9/2011 |
| WO | WO 2009/044475 A1 | | 4/2009 |

* cited by examiner

FIG. 4

Third frame

| | Remaining MB number | remainPic | k |
|---|---|---|---|
| h=0 | 5 | 2 | 3 |
| h=1 | 10 | 3 | 4 |
| h=2 | 16 | 0→4 | 4 |
| h=3 | 2 | 1 | 2 |

FIG. 5C

MOVING IMAGE CODING APPARATUS AND MOVING IMAGE CODING METHOD

This application claims priority to Japanese Patent Application No 2012-205826 filed on Sep. 19, 2012, the entire disclosure of which is hereby incorporated herein by reference.

BACKGROUND OF THE INVENTION

Field of the Invention

The present invention relates to a technique for coding moving images (video) for the compression of moving images (video), and more particularly, to a technique for coding moving images (video) using intra coding and inter coding.

Description of the Background Art

The techniques for coding moving images according to, for example, the MPEG-2 and H.264 standards, use intra coding and inter coding. Intra coding is complete within a target frame without any reference to other frames. Inter coding uses reference frames in coding a target frame.

All macroblocks constructing an I (intra coded) picture are intra coded. Macroblocks constructing a P (predicted) picture and a B (bi-directionally predicted) picture are inter coded. An I picture, whose macroblocks are all intra coded, has more code than a P or B picture. Although an I picture is coded by intra prediction under H.264, the I picture still has more code than a P or B picture.

The larger amount of code by I pictures can be a problem with systems that are required to reproduce or transmit signals with low delay. Additionally, the amount of code can change cyclically at every appearance of an I picture. Every such change in the code amount temporarily requires a large buffer size, which is inefficient.

When processing target data includes I pictures whose macroblocks are all intra coded, the I pictures may delay the data processing. Thus, the system that processes data including I pictures may fail to achieve low delay. A proposed solution to this problem is a coding technique called "intra refresh" (refreshing of intra-slices of an image), which is described in, for example, Non-patent Literature 1.

The intra refresh coding described in Non-patent Literature 1 avoids using I pictures, whose macroblocks within the frames are all intra coded. The intra refresh coding described in Non-patent Literature 1 arranges intra macroblocks in units of slices. All macroblocks within a slice of the frame are coded as intra macroblocks, for which discrete cosine transform (DCT) is performed directly without prediction. Such a slice is called an "intra slice." In the intra refresh coding, intra slices in different frames occur at sequentially differing positions between the frames so that the intra slices fill the entire screen in fixed cycles. In other words, the intra refresh coding generates intra slices that fill the entire screen in fixed cycles (to refresh to the screen). The intra slices have less code than I pictures. Systems that perform such an intra refresh process thus requires a smaller buffer size and achieves low delay.

As described in Non-patent Literature 1, the intra refresh process causes intra blocks to be scattered across a group of pictures (GOP).

However, the above intra refresh process requires all the macroblocks in each slice to be intra coded, and also requires intra slices to occur in different frames at positions sequentially differing from one another by one line. The resulting decoded images (video) can have a lower quality. More specifically, the intra slices can appear as scanning lines (horizontal strips) in the decoded images (video) when the images are reproduced consecutively.

To solve this problem, a technique described for example in Patent Literature 1 may be used to scatter intra macroblocks in units of macroblocks.

CITATION LIST

Patent Literature

Patent Literature 1: Japanese Unexamined Patent Publication No. 2004-215252

Non-patent Literature 1: Japan Patent Office, Reference Room, <http://www.jpo.go.jp/shiryou/s_sonota/hyoujun_gijutsu/nle/nle-7-1.html>, accessed on Aug. 13, 2012

However, the technique described in Patent Literature 1 uses a larger amount of code for intra macroblocks when processing an image with complex intra macroblocks. To reduce the amount of code of intra macroblocks, the intra macroblocks may be quantized roughly. However, the image quality of the intra macroblocks that are quantized roughly can differ significantly from the image quality of inter macroblocks neighboring these intra macroblocks. With the technique described in Patent Literature 1, the intra macroblocks can become distinguishable in the decoded images (video), or in other words, the decoded images (video) can have a lower image quality.

To solve the above problem, it is an object of the present invention to provide a moving image coding apparatus and a moving image coding method that enable coding of moving images with reduced deterioration in the image quality of decoded images (video), while reducing variations in the amount of code of intra macroblocks per frame.

SUMMARY OF THE INVENTION

To solve the above problem, the present invention provides a moving image coding apparatus for coding a moving image signal. The moving image coding apparatus includes a reset-timing determination unit, an activity calculation unit, an intra MB determination unit, and a coding unit.

The reset-timing determination unit detects a temporal position of a current frame image, which is a frame image of a processing target, based on a moving image signal, and determines a timing at which an intra refresh process is reset (started) for each line of macroblocks in the current frame image.

The activity calculation unit calculates an activity value indicating a complexity of an image for each macroblock of the current frame image based on the moving image signal.

The intra MB determination unit determines a macroblock to be set as an intra macroblock based on the activity value calculated by the activity calculation unit.

The coding unit codes the macroblock that has been set as an intra macroblock by the intra MB determination unit through an intra coding process.

The reset-timing determination unit determines the reset timing at which the intra refresh process is reset (started) in a manner that the reset timing differs for each line of macroblocks.

BRIEF DESCRIPTION OF THE DRAWINGS

FIG. 4 is a timing chart schematically showing the relationship between the intra refresh process for MBLs with h=0 to 3 and the remaining picture number remainPic.

FIG. 5C is a diagram describing the intra refresh process performed in cycles of four frames when one MBL consists of 16 macroblocks.

DESCRIPTION OF THE PREFERRED EMBODIMENT

First Embodiment

A first embodiment will now be described with reference to the drawings.

1.1 Structure of Moving Image Coding Apparatus

Figure 1:
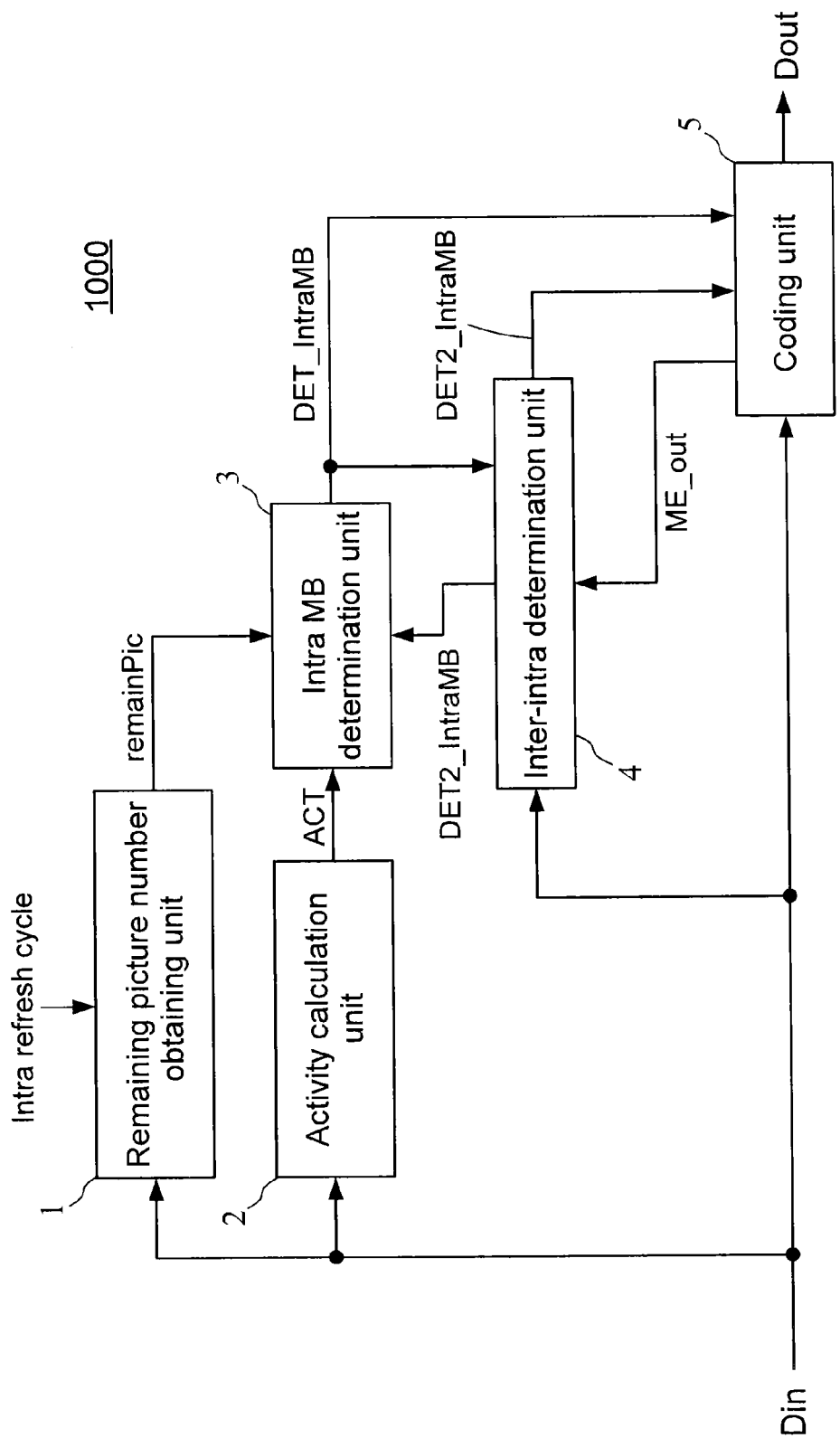
FIG. 1 schematically shows the structure of a moving image coding apparatus 1000 according to a first embodiment.

FIG. 1 schematically shows the structure of a moving image coding apparatus 1000 according to the first embodiment.

As shown in FIG. 1, the moving image coding apparatus 1000 includes a remaining picture number obtaining unit 1 (reset timing determination unit) and an activity calculation unit 2. The remaining picture number obtaining unit 1 detects the position of a processing target image (picture) on the time axis based on an input moving image signal Din. The activity calculation unit 2 receives an input moving image signal Din, and calculates an activity value for each macroblock of the processing target image (picture).

The moving image coding apparatus 1000 includes an intra MB determination unit 3 and an inter-intra determination unit 4. The intra MB determination unit 3 determines macroblocks in the processing target image (picture) to be set as intra macroblocks. The inter-intra determination unit 4 determines whether each macroblock of the processing target image (picture) is to be either inter coded or intra coded.

The moving image coding apparatus 1000 further includes a coding unit 5, which codes an input moving image signal Din based on the processing results obtained by the intra MB determination unit 3 and the inter-intra determination unit 4.

The remaining picture number obtaining unit 1 receives a moving image signal Din, which can form a plurality of frame images (pictures), and information about the cycle of an intra refresh process. The remaining picture number obtaining unit 1 identifies the temporal position of a processing target frame (picture) based on the moving image signal Din, and obtains the number of remaining pictures set for each line of macroblocks based on the intra refresh cycle (described in detail later). The information about the intra refresh cycle is input from a setting unit (not shown), and may be set by using, for example, the number of frames (the number of pictures). For example, the intra refresh cycle of 30 (30 frames) indicates that the intra refresh process is performed in units of time corresponding to 30 frames.

The remaining picture number obtaining unit 1 outputs the obtained information about the number of remaining pictures (remainPic) to the intra MB determination unit 3.

The activity calculation unit 2 receives the moving image signal Din, and calculates an activity value ACT for each macroblock of the processing target frame image (picture) (described in detail later). The activity calculation unit 2 outputs the information about the activity value ACT calculated for each macroblock to the intra MB determination unit 3.

The intra MB determination unit 3 receives the information about the remaining picture number remainPic, which is output from the remaining picture number obtaining unit 1, and information about the activity value ACT calculated for each macroblock by the activity calculation unit 2. The intra MB determination unit 3 further receives information about the determination result indicating whether each macroblock is to be inter coded or intra coded (described in detail later), which is output from the inter-intra determination unit 4. The intra MB determination unit 3 determines whether each macroblock is to be set as an intra macroblock based on the information about the remaining picture number remainPic. The intra MB determination unit 3 outputs the resulting information (DET_IntraMB) for each macroblock indicating whether the macroblock is to be set as an intra macroblock to the inter-intra determination unit 4 and the coding unit 5.

The inter-intra determination unit 4 receives a moving image signal Din, intra macroblock setting information (DET_IntraMB) for each macroblocok output from the intra MB determination unit 3, and a motion-compensated moving image signal ME_out (moving image signal generated by performing motion compensation of a frame image one frame previous to the processing target picture (current frame image) using a motion vector), which is output from the coding unit 5. The inter-intra determination unit 4 detects a macroblock that has yet to be set as an intra macroblock based on the intra macroblock setting information (DET_IntraMB). The inter-intra determination unit 4 calculates the cost for coding of the macroblock (macroblock that has yet to be set as an intra macroblock by the intra MB determination unit 3) based on the motion-compensated moving image signal ME_out, and determines whether the macroblock is to be set as an intra macroblock based on the calculated coding cost. The inter-intra determination unit 4 outputs information for each macroblock indicating whether the macroblock is to be set as an intra macroblock (DET2_IntraMB) to the intra MB determination unit 3 and the coding unit 5.

The coding unit 5 receives a moving image signal Din, intra macroblock setting information (DET_IntraMB) for each macroblock output from the intra MB determination unit 3, and intra macroblock setting information (DET2_IntraMB) for each macroblock output from the inter-intra determination unit 4. The coding unit 5 subjects each macroblock of every frame image (picture) formed by the moving image signal Din to intra coding or inter coding based on the intra macroblock setting information (DET_IntraMB) output from the intra MB determination unit 3 and the intra macroblock setting information (DET2_IntraMB) output from the inter-intra determination unit 4. The coding unit 5 outputs the signal resulting from the coding as a coded moving image signal Dout. The coding unit 5 also outputs a moving image signal ME_out, which is used to process the current frame, to the inter-intra determination unit 4. The moving image signal ME_out is generated by motion compensation using a motion vector obtained by a moving image signal of the current frame (the processing target frame) and a moving image signal of the frame one frame previous to the current frame.

1.2 Operation of Moving Image Coding Apparatus

The operation of the moving image coding apparatus 1000 with the above-described structure will now be described.

Figure 2:
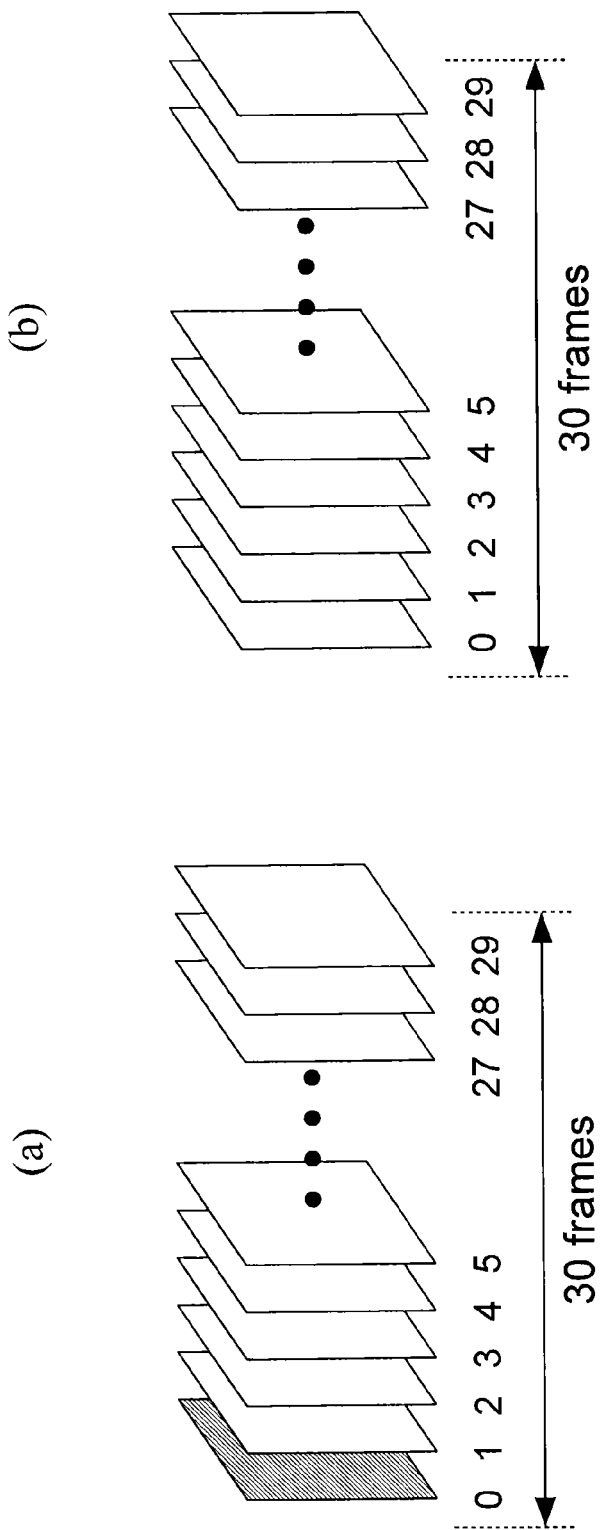
FIG. 2 shows an example of a moving image signal Din input into the moving image coding apparatus 1000.

FIG. 2 shows an example of a moving image signal Din input into the moving image coding apparatus 1000. The moving image signal Din shown in FIG. 2 has a frame rate of 30 fps. For constant bit rate (CBR) control, the moving image signal Din may be, for example, a moving image signal that does not use B pictures. More specifically, the moving image signal Din includes an I picture only as its first frame (picture), and includes P pictures as all the frames (pictures) following the first frame. In other words, the moving image signal Din has the picture structure shown in FIG. 2(a) only for the first 30 frames, and has the picture structure shown in FIG. 2(b) for subsequent frames in units of 30 frames. The pictures corresponding to a unit time are numbered in chronological order (the unit time is 1 second in the example of FIG. 2, and the number of frames (pictures) per unit time is 30). Among the first 30 frames, only the picture with picture number 0 is an I picture, and the pictures with picture numbers 1 to 29 are P pictures. Subsequent pictures, which are numbered 0 to 29 (all pictures) in units of 30 frames, are all P pictures.

Hereafter, the moving image signal Din has a frame rate of 30 fps, and includes an I picture only as the first frame and P pictures as all the subsequent frames. The intra refresh process is performed in cycles of 30 frames (time corresponding to 30 frames).

The moving image signal Din is input into the remaining picture number obtaining unit 1, the activity calculation unit 2, the inter-intra determination unit 4, and the coding unit 5.

The remaining picture number obtaining unit 1 detects the position of a processing target frame (picture) on the time axis within a unit time based on the input moving image signal Din. The remaining picture number obtaining unit 1 then calculates the number of remaining pictures corresponding to the time taken before the intra refresh process is reset based on the intra refresh cycle (30 frames in the present embodiment).

The moving image coding apparatus 1000 assumes N (N is a natural number equal to or greater than 2) macroblock lines (hereafter, "MBLs") as one group, and sets the time taken before the intra refresh process is reset (time to be delayed) differently for each MBL within the same group. This will be described with reference to FIG. 3.

Figure 3:
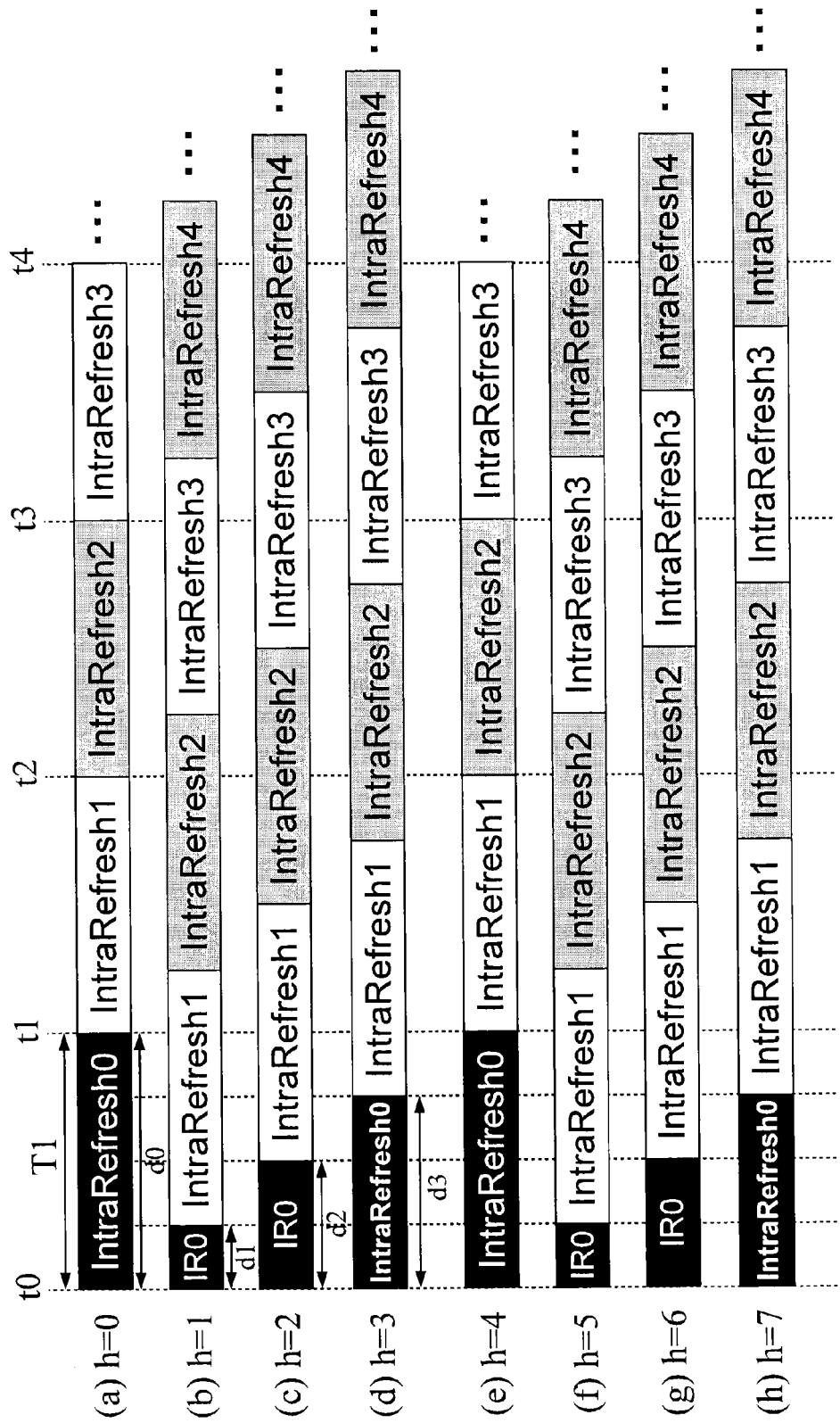
FIG. 3 is a timing chart showing an intra refresh process performed for each MBL when one group consists of four MBLs.

FIG. 3 is a timing chart schematically showing the delay time for each MBL taken before the reset of the intra refresh process when N=4, or one group includes four MBLs. In FIG. 3, the horizontal axis is the time axis, and h is the horizontal position of each macroblock line. In FIG. 3, the processes (a) to (h) are on the same time axis. Although N=4 in the example shown in FIG. 3, N may be a natural number other than 4. For ease of explanation, an example where N=4 will be described below.

As shown in FIG. 3, the start (reset) timing of the intra refresh process is set differently for each MBL in the same group. More specifically, as shown in FIG. 3, the delay time (the time before the reset (start) of the next intra refresh process) is set in the manner described below. The delay time (the time before the reset of the next intra refresh process) is set by using the number of frames. For ease of explanation, the processes performed for MBLs with h=0 to 7 (8 lines) will be described.

(1) In the intra refresh process for MBLs with h=0 and 4, the delay time (the time before the reset of the next intra refresh process) is set to 0 frame.

The intra refresh process for the MBLs with h=0 and 4 is reset at timings t0, t1, t2, t3, and t4 in FIG. 3. At timings t0, t1, t2, t3, and t4, all macroblocks included in the MBLs with h=0 and 4 are used as the candidates for intra macroblocks. From t1 to t2, for example, the intra refresh corresponding to one cycle (the processing indicated by "IntraRefresh1" in FIG. 3) is performed for the MBLs with h=0 and 4.

The intra refresh process for the MBLs with h=0 and 4 is reset at timing t2. From t2 to t3, the intra refresh corresponding to one cycle (the processing indicated by "IntraRefresh2" in FIG. 3) is performed for the MBLs with h=0 and 4 in the same manner as described above.

The intra refresh process for the MBLs with h=0 and 4 is reset at timing t3. From t3 to 4, the intra refresh corresponding to one cycle (the processing indicated by "IntraRefresh3" in FIG. 3) is performed for the MBLs with h=0 and 4. The same processing as described above is repeated hereafter.

FIG. 3 shows the example in which the moving image signal shown in FIG. 2 is input. The first frame is input at the start timing t0. At the start timing t0, all the macroblocks of the first frame, which is an I picture, are coded into intra macroblocks. No intra refresh process is performed for the MBLs with h=0 and 4 from timing t0, at which the frame subsequent to the previous processing target is set as the processing target, to the timing t1.

(2) In the intra refresh process for MBLs with h=1 and 5, the delay time (the time before the reset of the next intra refresh process) is set to the number of frames corresponding to the time d1 shown in FIG. 3.

The intra refresh process for the MBLs with h=1 and 5 is reset at the timing delayed by the time d1 from each of the start timings (reset timings) t0 to t4 of the intra refresh process for the MBLs with h=0 and 4. In other words, at the timing delayed by the time d1 from each of the timings t0 to t4, all macroblocks included in the MBLs with h=1 and 5 are used as the candidates for intra macroblocks. For example, the intra refresh corresponding to one cycle (the processing indicated by "IntraRefresh1" in FIG. 3) is performed for the MBLs with h=1 and 5 from timing (t0+d1), which is the timing delayed by the time d1 from timing t0, to timing (t1+d1), which is the timing delayed by the time d1 from timing t1.

In the same manner, the intra refresh process for the MBLs with h=1 and 5 is reset at the timing delayed by the time d1 from timing t1. The intra refresh corresponding to one cycle (the processing indicated by "IntraRefresh2" in FIG. 3) is performed for the MBLs with h=1 and 5 from timing (t1+d1) to timing (t2+d1).

The intra refresh process for the MBLs with h=1 and 5 is reset at the timing delayed by the time d1 from timing t2. The intra refresh corresponding to one cycle (the processing indicated by "IntraRefresh3" in FIG. 3) is performed for the MBLs with h=1 and from timing (t2+d1) to timing (t3+d1). The same processing as described above is repeated hereafter.

At the start timing t0 at which an I frame is input, all the macroblocks of the frame are set as intra macroblocks and are intra coded. No intra refresh process is performed for the MBLs with h=1 and 5 before timing t0+d1 (the timing when the time d1 has passed from timing t0).

(3) In the intra refresh process for MBLs with h=2 and 6, the delay time (the time before the reset of the next intra refresh process) is set to the number of frames corresponding to the time d2 shown in FIG. 3.

The intra refresh process for the MBLs with h=2 and 6 is reset at the timing delayed by the time d2 from each of the start timings (reset timings) t0 to t4 of the intra refresh process for the MBLs with h=0 and 4. In other words, at the timing delayed by the time d2 from each of the timings t0 to t4, all macroblocks included in the MBLs with h=2 and 6 are used as the candidates for intra macroblocks. For example, the intra refresh corresponding to one cycle (the processing indicated by "IntraRefresh1" in FIG. 3) is performed for the MBLs with h=2 and 6 from timing (t0+d2), which is the timing delayed by the time d2 from timing t0, to timing (t1+d2), which is the timing delayed by the time d2 from timing t1.

In the same manner as described above, the intra refresh process for the MBLs with h=2 and 6 is reset at the timing delayed by the time d2 from timing t1. The intra refresh corresponding to one cycle (the processing indicated by "IntraRefresh2" in FIG. 3) is performed for the MBLs with h=2 and 6 from timing (t1+d2) to timing (t2+d2).

The intra refresh process for the MBLs with h=2 and 6 is reset at the timing delayed by the time d2 from timing t2. The intra refresh corresponding to one cycle (the processing indicated by "IntraRefresh3" in FIG. 3) is performed for the MBLs with h=2 and 6 from timing (t2+d2) to timing (t3+d2). The same processing as described above is repeated hereafter.

At the start timing t0 at which an I frame is input, all the macroblocks of the frame are set as intra macroblocks and are intra coded. No intra refresh process is performed for the MBLs with h=2 and 6 before timing t0+d2 (the timing when the time d2 has passed from timing t0).

(4) In the intra refresh process for MBLs with h=3 and 7, the delay time (the time before the reset of the next intra refresh process) is set to the number of frames corresponding to the time d3 shown in FIG. 3.

The intra refresh process for the MBLs with h=3 and 7 is reset at the timing delayed by the time d3 from each of the start timings (reset timings) t0 to t4 of the intra refresh process for the MBLs with h=0 and 4. In other words, at the timing delayed by the time d3 from each of the timings t0 to t4, all macroblocks included in the MBLs with h=3 and 7 are used as the candidates for intra macroblocks. For example, the intra refresh corresponding to one cycle (the processing indicated by "IntraRefresh1" in FIG. 3) is performed for the MBLs with h=3 and 7 from timing (t0+d3), which is the timing delayed by the time d3 from timing t0, to timing (t1+d3), which is the timing delayed by the time d3 from timing t1.

In the same manner, the intra refresh process for the MBLs with h=3 and 7 is reset at the timing delayed by the time d3 from timing t1. The intra refresh corresponding to one cycle (the processing indicated by "IntraRefresh2" in FIG. 3) is performed for the MBLs with h=3 and 7 from timing (t1+d3) to timing (t2+d3).

The intra refresh process for the MBLs with h=3 and 7 is reset at the timing delayed by the time d3 from timing t2. The intra refresh corresponding to one cycle (the processing indicated by "IntraRefresh3" in FIG. 3) is performed for the MBLs with h=3 and 7 from timing (t2+d3) to timing (t3+d3). The same processing as described above is repeated hereafter.

At the start timing t0 at which an I frame is input, all the macroblocks of the frame are set as intra macroblocks and are intra coded. No intra refresh process is performed for the MBLs with h=3 and 7 before timing t0+d3 (the timing when the time d3 has passed from timing t0).

In one example, the delay times d1, d2, and d3 may be set to satisfy the relationship below.

$$d2 = 2 \times d1$$

$$d3 = 3 \times d1$$

The relationship between the delay times d1, d2, and d3 should not be limited to the above relationship.

The moving image coding apparatus 1000 controls the intra refresh process in a manner that all the macroblocks are coded into intra macroblocks in the cycle T1 (T1 is the time corresponding to 30 frames in the present embodiment) (described in detail later).

The remaining picture number obtaining unit 1 obtains the delay time before the reset timing of the intra refresh process (the timing at which all macroblocks in the MBL are set (reset) as the candidates for intra macroblocks) as the remaining picture number. More specifically, the remaining picture number obtaining unit 1 obtains the delay time before the reset timing of the intra refresh process for each MBL (the timing before the intra refresh corresponding to the next cycle is started) as the remaining picture number by the formula below.

$$\text{remainPic}[\text{mod}(h,N)] = \text{IntraRefreshCycle}/N \times \text{mod}(h,N)$$

In the formula, mod(h, x) is a function to obtain a remainder returned by modulus x.

IntraRefreshCycle is the cycle (the number of frames) of the intra refresh process.

N is the number of MBLs in one group.

In the present embodiment, N=4 and IntraRefreshCycle=30, and thus remainPic[mod(h,4)]=30/4×mod(h,4).

For integer arithmetic, the activity calculation unit 2 truncates the value, and obtains the remaining picture number remainPic[mod(h, 4)], which indicates the delay time before the reset timing of the intra refresh process for each MBL (the start timing of the next intra refresh process), by the formula below.

$$\text{remainPic}[\text{mod}(h,4)] = 7 \times \text{mod}(h,4)$$

Through the processing expressed by the above formula, the activity calculation unit 2 calculates the remaining picture number remainPic, which indicates the delay time before the rest timing of the intra refresh process (the start timing of the next intra refresh process) for h=0 to 3 in the manner described below.

(a) h=0

$$\text{remainPic}[\text{mod}(0,4)] = \text{remainPic}[0] = 0$$

The above formula indicates that the intra refresh process is started at the timing corresponding to 0 frame after the start timing (or at the current frame) for the MBL with h=0. For the MBL with h=0, the intra refresh process is reset at the timing corresponding to 0 frame after the start timing (at the current frame), and all the macroblocks included in the MBL with h=0 are used as the candidates for intra macroblocks.

(b) h=1

$$\text{remainPic}[\text{mod}(1,4)] = \text{remainPic}[1] = 7$$

The above formula indicates that the intra refresh process is started at the timing corresponding to 7 frames after the start timing for the MBL with h=1. For the MBL with h=1, the intra refresh process is reset at the timing corresponding to 7 frames after the start timing (at the current frame), and all the macroblocks included in the MBL with h=1 are used as the candidates for intra macroblocks.

(c) h=2 remainPic[mod(2,4)]=remainPic[2]=14

The above formula indicates that the intra refresh process is started at the timing corresponding to 14 frames after the start timing for the MBL with h=2. For the MBL with h=2, the intra refresh process is reset at the timing corresponding to 14 frames after the start timing, and all the macroblocks included in the MBL with h=2 are used as the candidates for intra macroblocks.

(d) h=3 remainPic[mod(3,4)]=remainPic[3]=21

The above formula indicates that the intra refresh process is started at the timing corresponding to 21 frames after the start timing for the MBL with h=3. For the MBL with h=3, the intra refresh process is reset at the timing corresponding to 21 frames after the start timing, and all the macroblocks included in the MBL with h=3 are used as the candidates for intra macroblocks.

The remaining picture number obtaining unit 1 then performs the processing for subsequent frames, and decrements each of the remaining picture numbers remainPic[0] to remainPic[3] by one. The remaining picture number obtaining unit 1 stores information about the remaining picture numbers remainPic[0] to remainPic[3], which is then output to the intra MB determination unit 3.

Figure 4:
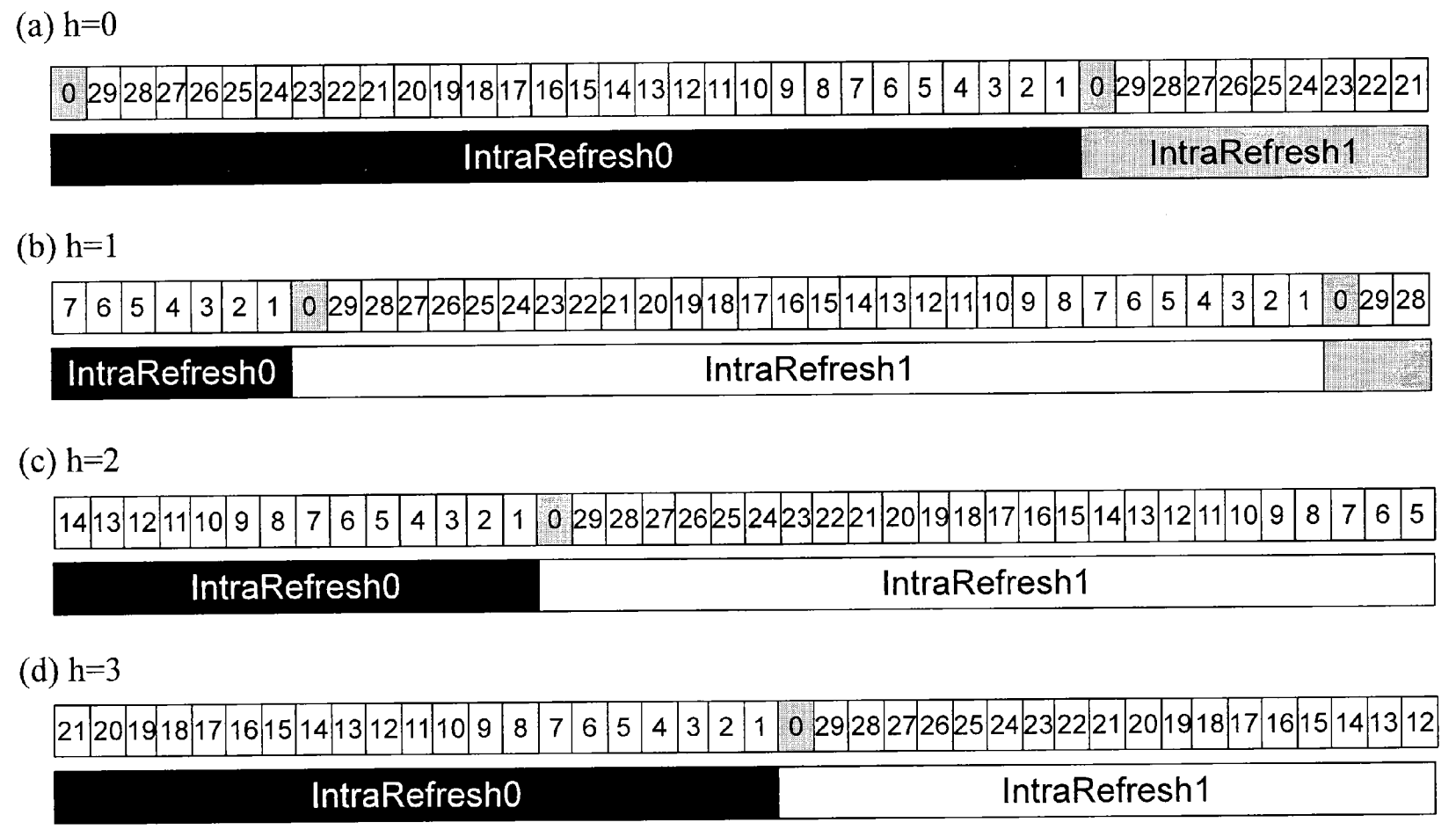

FIG. 4 is a timing chart schematically showing the intra refresh process for MBLs with h=0 to 3 and the resulting remaining picture numbers remainPic. In FIG. 4, the horizontal axis is the time axis. In FIG. 4, the processes (a) to (d) are on the same time axis. In the same manner as FIG. 3, FIG. 4 shows the processes performed when the moving image signal shown in FIG. 2 is input.

For the MBL with h=0, as shown in FIG. 4, the intra refresh process is started at the timing corresponding to 0 frame after the start timing (or at the current frame). The intra refresh process is thereafter repeated in cycles of 30 frames. The intra refresh process for the first P picture frame is started after 30 frames.

For the MBL with h=1, the intra refresh process (IntraRefresh1) for the first P picture frame is started after 7 frames. Subsequently, the intra refresh process is thereafter repeated in cycles of 30 frames.

For the MBL with h=2, the intra refresh process (IntraRefresh1) for the first P picture frame is started after 14 frames. Subsequently, the intra refresh process is repeated in cycles of 30 frames.

For the MBL with h=3, the intra refresh process (IntraRefresh1) for the first P picture frame is started after 21 frames. Subsequently, the intra refresh process is repeated in cycles of 30 frames.

The activity calculation unit 2 calculates the activity value of each macroblock based on the moving image signal Din. The activity value is a numerical value indicating the complexity of the image within each macroblock. The activity calculation unit 2 subjects the pixel value of each pixel in the macroblock to, for example, Hadamard transform, to extract frequency components, and calculates the activity value indicating the complexity of the image in the macroblock based on the extracted frequency components. More specifically, when the macroblock consists of 8 by 8 pixels, the activity calculation unit 2 subjects each line of the macroblock (each of 8 lines) to the 1×8 Hadamard transform matrix [1 −1 1 −1 1 −1 1 −1] to extract frequency components. The activity calculation unit 2 then adds up the extracted frequency components for each line (adds the absolute values of the frequency components for each line) to calculate the activity value. When the pixel value of each of the 8 by 8 pixels of the macroblock is Aij (i is an integer satisfying 1≤i≤8, and j is an integer satisfying 1≤j≤8), the activity value ACT is calculated using formula 1 below. In the formula, Aij is the pixel value in the i-th row and j-th column of the matrix.

Formula 1

$$ACT = \sum_{i=1}^{8} \left| \sum_{j=1}^{8} A_{i,j} \cdot (-1)^{j+1} \right| \quad (1)$$

The calculation using formula 1 enables horizontal high-frequency components to be extracted simply by integer arithmetic. The activity calculation unit 2 can thus calculate the activity value for each macroblock at high speed.

For a macroblock consisting of M by N pixels, the activity value ACT can be calculated using formula 2 below. In the formula, Aij is the pixel value of each pixel included in the macroblock (i is an integer satisfying 1≤i≤M, and j is an integer satisfying 1≤j≤N). To yield the activity value ACT that falls within a predetermined range, the calculation may involve adjustment using a predetermined coefficient or normalization.

Formula 2

$$ACT = \sum_{i=1}^{M} \left| \sum_{j=1}^{N} A_{i,j} \cdot (-1)^{j+1} \right| \quad (2)$$

The activity value may be calculated with any method that can extract the complexity of the image in each macroblock other than the above method. The pixel value may be the luminance value of each pixel in the macroblock or the pixel value expressed using the color components of the image in the macroblock.

Information about the activity value (ACT) calculated by the activity calculation unit 2 is output to the intra MB determination unit 3.

The intra MB determination unit 3 determines macroblocks to be set as intra macroblocks for each MBL based on the remaining picture numbers remainPic[0] to remainPic[3], which are output from the remaining picture number obtaining unit 1.

(1) The intra MB determination unit 3 sets k macroblocks as intra macroblocks sequentially in order of smaller activity values. Here, k is calculated by the formula below.

k=(remainMB+remainPic[mod($h$,4)]−1)/remainPic[mod($h$,4)]

When the number remainPic[mod(h,4)] is 0, the intra MB determination unit 3 sets the number remainPic[mod(h, 4)] to 30 (the cycle of the intra refresh process (the number of frames)).

In the above formula, remainMB is the number of macroblocks that have yet to be set as intra macroblocks in the MBL. The initial value of the number remainMB (the value when the intra refresh process is started) is the number of macroblocks included in the MBL. When the first cycle of the intra refresh process completes to start the second cycle of the intra refresh process, the number remainMB is reset to the number of macroblocks included in the MBL.

(2) The intra MB determination unit 3 sets an intra refresh completion flag indicating that the intra refresh process has been performed for a macroblock set as an intra macroblock to prevent the macroblock from being set as an intra macroblock in the processing of subsequent frames. The intra MB determination unit 3 also sets the intra refresh completion flag indicating that the intra refresh process has been performed for a macroblock set as an intra macroblock by the inter-intra determination unit to prevent the macroblock from being set as an intra macroblock in the processing for subsequent frames.

(3) The intra MB determination unit 3 subtracts the number of macroblocks set as intra macroblocks from the variable remainMB, which indicates the number of remaining macroblocks, and stores the resulting difference as the number remainMB.

The intra MB determination unit 3 repeats the processing (1) to (3) above for each MBL for which the intra refresh process has been started, and sets all the macroblocks as intra macroblocks in one cycle of the intra refresh process.

The processing performed by the intra MB determination unit 3 will now be described with reference to FIGS. 5A, 5B, 5C, and 5D.

FIG. 5A to 5D are diagrams describing an intra refresh process performed when one MBL includes 16 macroblocks and the intra refresh process is performed in cycles of 4 frames.

Figure 5A:
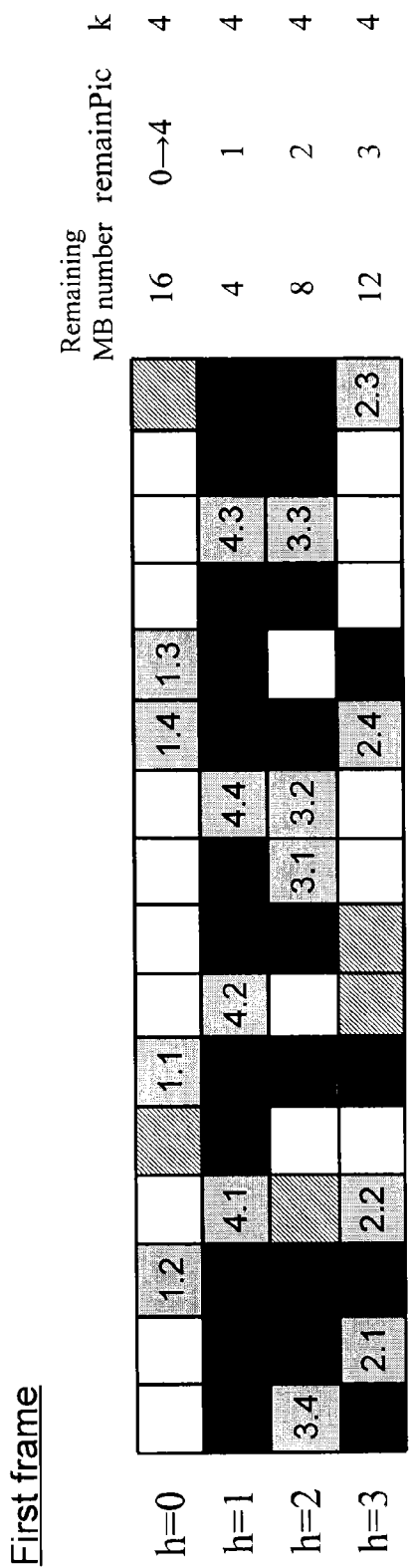
FIG. 5A is a diagram describing the intra refresh process performed in cycles of four frames when one MBL consists of 16 macroblocks.
Figure 5B:
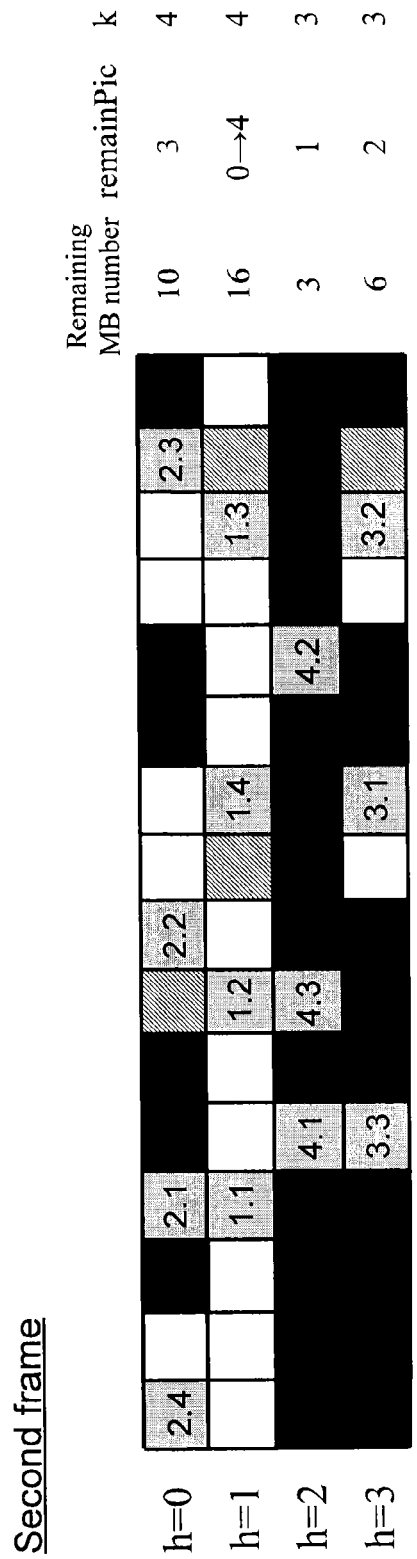
FIG. 5B is a diagram describing the intra refresh process performed in cycles of four frames when one MBL consists of 16 macroblocks.
Figure 5D:
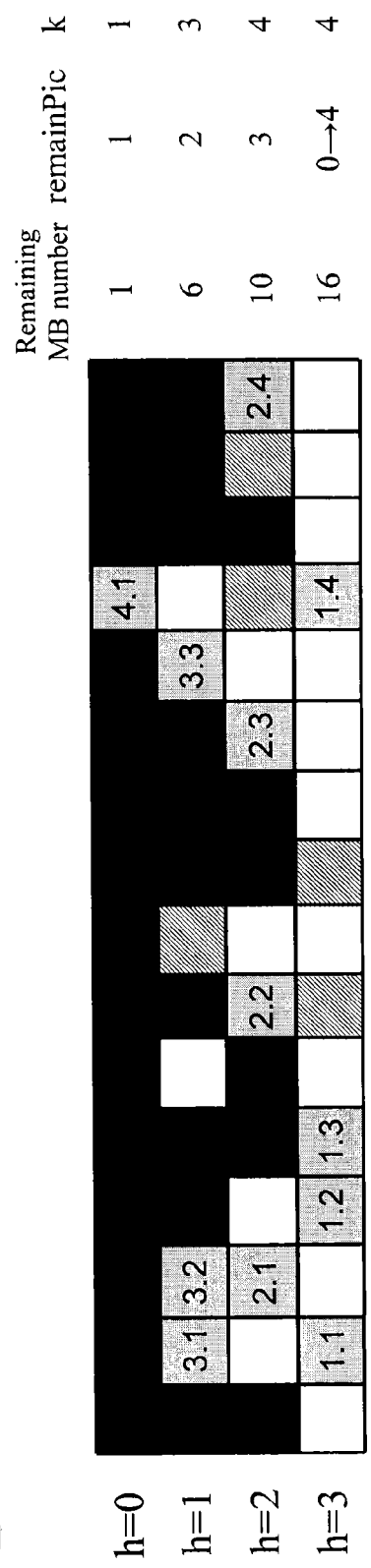
FIG. 5D is a diagram describing the intra refresh process performed in cycles of four frames when one MBL consists of 16 macroblocks.

FIG. 5A schematically shows the processing of the first frame, FIG. 5B the processing of the second frame, FIG. 5C the processing of the third frame, and FIG. 5D the processing of the fourth frame. The processing shown in FIGS. 5A to 5D corresponds to the time from timing t1 to timing t2 shown in FIG. 3.

The time before the intra refresh process for the MBL with h=0 is reset (time before the intra refresh process is started) corresponds to zero frame. The time before the intra refresh process for the MBL with h=1 is reset (time before the intra refresh process is started) corresponds to one frame. The time before the intra refresh process for the MBL with h=2 is reset (time before the intra refresh process is started) corresponds to two frames. The time before the intra refresh process for the MBL with h=3 is reset (time before the intra refresh process is started) corresponds to three frames. The cycle of the intra refresh process is the time corresponding to four frames.

Processing for the First Frame (FIG. 5A)

In the processing of the first frame shown in FIG. 5A, the number remainPic[mod(h, 4)] is 0 for the MBL with h=0. Thus, the intra refresh process for the MBL with h=0 is reset, and all macroblocks (16 macroblocks) of the MBL with h=0 are used as the candidates for intra macroblocks. The number remainPic[mod(h, 4)] has been set to 4 (the cycle of the intra refresh process (the number of frames)). The intra MB determination unit 3 calculates the number k of macroblocks to be set as intra macroblocks in the MBL in the manner described below. The calculation involves truncation to yield an integer as the value k.

$$k = (remainMB + remainPic[\text{mod}(0, 4)] - 1) / remainPic[\text{mod}(0, 4)]$$
$$= INT((16 + 4 - 1)/4) = 4$$

More specifically, the intra MB determination unit 3 sets four macroblocks as intra macroblocks sequentially in order of smaller activity values. In FIG. 5A, the macroblock indicated by "1.1" has the smallest activity value, the macroblock indicted by "1.2" has the second smallest activity value, the macroblock indicated by "1.3" has the third smallest activity value, and the macroblock indicted by "1.4" has the fourth smallest activity value. Thus, the shaded macroblocks are set as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5A, the two hatched macroblocks in the MBL with h=0 are the macroblocks set as intra macroblocks by the inter-intra determination unit 4. Thus, the intra MB determination unit 3 sets the intra refresh completion flag for the four macroblocks "1.1" to "1.4" in the MBL with h=0 and the two hatched macroblocks set as intra macroblocks by the inter-intra determination unit, or six macroblocks in total, to prevent these macroblocks from being set as intra macroblocks in the processing for subsequent frames. In FIG. 5A to FIG. 5D, the solid black macroblocks are the macroblocks for which the intra refresh completion flag has been set.

For the MBL with h=1, the number remainPic[mod(h, 4)] is "1" and the number of macroblocks that have yet to be set as intra macroblocks is "4" (remainMB=4). The intra MB determination unit 3 calculates the number k of macroblocks that are to be set as intra macroblocks in the MBL by the following formula.

$$k = (remainMB + remainPic[\text{mod}(1, 4)] - 1) / remainPic[\text{mod}(1, 4)]$$
$$= INT((4 + 1 - 1)/1) = 4$$

The intra MB determination unit 3 sets four macroblocks as intra macroblocks sequentially in order of smaller activity values. In FIG. 5A, the macroblock indicated by "4.1" has the smallest activity value, the macroblock indicted by "4.2" has the second smallest activity value, the macroblock indicated by "4.3" has the third smallest activity value, and the macroblock indicted by "4.4" has the fourth smallest activity value. Thus, the shaded macroblocks are set as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5A, the intra MB determination unit 3 sets the intra refresh completion flag for the four macroblocks "4.1" to "4.4" of the MBL with h=1.

For the MBL with h=2, the number remainPic[mod(h, 4)] is "2" and the number of macroblocks that have yet to be set as intra macroblocks is "8" (remainMB=8). The intra MB determination unit 3 calculates the number k of macroblocks to be set as intra macroblocks in the MBL by the following formula.

$$k = (remainMB + remainPic[\mathrm{mod}(2, 4)] - 1) / remainPic[\mathrm{mod}(2, 4)]$$
$$= INT((8 + 2 - 1)/2) = 4$$

The intra MB determination unit 3 sets four macroblocks as intra macroblocks sequentially in order of smaller activity values. In FIG. 5A, the macroblock indicated by "3.1" has the smallest activity value, the macroblock indicted by "3.2" has the second smallest activity value, the macroblock indicated by "3.3" has the third smallest activity value, and the macroblock indicted by "3.4" has the fourth smallest activity value. Thus, the shaded macroblocks are set as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5A, one hatched macroblock in the MBL with h=2 is the macroblock set as an intra macroblock by the inter-intra determination unit 4. Thus, the intra MB determination unit 3 sets the intra refresh completion flag for the four macroblocks "3.1" to "3.4" in the MBL with h=2 and the hatched macroblock set as an intra macroblock by the inter-intra determination unit, or five macroblocks in total, to prevent these macroblocks from being set as intra macroblocks in the processing for subsequent frames.

For the MBL with h=3, the number remainPic[mod(h, 4)] is "3" and the number of macroblocks that have yet to be set as intra macroblocks is "12" (remainMB=12). The intra MB determination unit 3 calculates the number k of macroblocks that are to be set as intra macroblocks in the MBL by the following formula.

$$k = (remainMB + remainPic[\mathrm{mod}(3, 4)] - 1) / remainPic[\mathrm{mod}(3, 4)]$$
$$= INT((12 + 3 - 1)/3) = 4$$

The intra MB determination unit 3 sets four macroblocks as intra macroblocks sequentially in order of smaller activity values. In FIG. 5A, the macroblock indicated by "2.1" has the smallest activity value, the macroblock indicted by "2.2" has the second smallest activity value, the macroblock indicated by "2.3" has the third smallest activity value, and the macroblock indicted by "2.4" has the fourth smallest activity value. Thus, the shaded macroblocks are set as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5A, the two hatched macroblocks in the MBL with h=3 are the macroblocks set as intra macroblocks by the inter-intra determination unit 4. Thus, the intra MB determination unit 3 sets the intra refresh completion flag for the four macroblocks "2.1" to "2.4" in the MBL with h=3 and the two hatched macroblocks set as intra macroblocks by the inter-intra determination unit, or six macroblocks in total, to prevent these macroblocks from being set as intra macroblocks in the processing for subsequent frames.

Processing for the Second Frame (FIG. 5B)

In the processing of the second frame shown in FIG. 5B, remainPic[mod(h, 4)]=3 and remainMB=10 for the MBL with h=0. Thus, the intra MB determination unit 3 calculates the number k of macroblocks to be set as intra macroblocks in this MBL in the manner described below.

$$k = (remainMB + remainPic[\mathrm{mod}(0, 4)] - 1) / remainPic[\mathrm{mod}(0, 4)]$$
$$= INT((10 + 3 - 1)/3) = 4$$

The intra MB determination unit 3 sets four macroblocks as intra macroblocks sequentially in order of smaller activity values. In FIG. 5B, the macroblock indicated by "2.1" has the smallest activity value, the macroblock indicted by "2.2" has the second smallest activity value, the macroblock indicated by "2.3" has the third smallest activity value, and the macroblock indicted by "2.4" has the fourth smallest activity value. Thus, the intra MB determination unit 3 sets the shaded macroblocks as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5B, one hatched macroblock in the MBL with h=0 is the macroblock set as an intra macroblock by the inter-intra determination unit 4. Thus, the intra MB determination unit 3 sets the intra refresh completion flag for the four macroblocks "2.1" to "2.4" in the MBL with h=0 and the hatched macroblock set as an intra macroblock by the inter-intra determination unit, or five macroblocks in total, to prevent these macroblocks from being set as intra macroblocks in the processing for subsequent frames. As a result, the number of macroblocks remainMB of the MBL with h=0 that have yet to be set as intra macroblocks is "5," which is calculated as the number remainMB=10−5=5.

In the processing for the second frame in FIG. 5B for the MBL with h=1, remainPic[mod(h, 4)]=0, and thus the intra refresh process is reset, and the number remain Pic is set as the number remainPic[mod(h, 4)]=4.

All the macroblocks in the MBL with h=1 are used as the candidates for intra macroblocks. In other words, remainMB=16.

Thus, the intra MB determination unit 3 calculates the number k of macroblocks to be set as intra macroblocks in the MBL in the manner described below.

$$k = (remainMB + remainPic[\mathrm{mod}(1, 4)] - 1) / remainPic[\mathrm{mod}(1, 4)]$$
$$= INT((16 + 4 - 1)/4) = 4$$

The intra MB determination unit 3 sets four macroblocks as intra macroblocks sequentially in order of smaller activity values. In FIG. 5B, the macroblock indicated by "1.1" has the smallest activity value, the macroblock indicted by "1.2" has the second smallest activity value, the macroblock indicated by "1.3" has the third smallest activity value, and the macroblock indicted by "1.4" has the fourth smallest activity value. Thus, the intra MB determination unit 3 sets the shaded macroblocks as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5B, two hatched macroblocks in the MBL with h=1 are the macroblocks set as intra macroblocks by the inter-intra determination unit 4. Thus, the intra MB determination unit 3 sets the intra refresh completion flag for the four macroblocks "1.1" to "1.4" in the MBL with h=1 and the two hatched macroblocks set as intra macroblocks by the inter-intra determination unit, or six macroblocks in total, to prevent these macroblocks from being set as intra macroblocks in the processing for subsequent frames. As a result, the number of macroblocks remainMB of the MBL with h=1 that have yet to be set as intra macroblocks is 6, which is calculated as the number remainMB=16−6=6.

In the processing for the second frame in FIG. 5B for the MBL with h=3, remainPic[mod(h, 4)]=2 and remainMB=6, and thus the intra MB determination unit 3 calculates the number k of macroblocks to be set as intra macroblocks in the MBL in the manner described below.

$$k = (remainMB + remainPic[\mathrm{mod}(3, 4)] - 1) / remainPic[\mathrm{mod}(3, 4)]$$
$$= INT((6 + 2 - 1)/2) = 3$$

The intra MB determination unit 3 sets three macroblocks as intra macroblocks sequentially in order of smaller activity values. In FIG. 5B, the macroblock indicated by "3.1" has the smallest activity value, the macroblock indicted by "3.2" has the second smallest activity value, and the macroblock indicated by "3.3" has the third smallest activity value. Thus, the intra MB determination unit 3 sets the shaded macroblocks as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5B, one hatched macroblock in the MBL with h=3 is the macroblock set as an intra macroblock by the inter-intra determination unit 4. Thus, the intra MB determination unit 3 sets the intra refresh completion flag for the three macroblocks "3.1" to "3.3" in the MBL with h=3 and the hatched macroblock set as an intra macroblock by the inter-intra determination unit, or four macroblocks in total, to prevent these macroblocks from being set as intra macroblocks in the processing for subsequent frames. As a result, the number of macroblocks remainMB of the MBL with h=3 that have yet to be set as intra macroblocks is "2," which is calculated as the number remainMB=6−4=2.

Processing for the Third Frame (FIG. 5C)

In the processing of the third frame shown in FIG. 5C for the MBL with h=0, remainPic[mod(h, 4)]=2 and remainMB=5, and thus the intra MB determination unit 3 calculates the number k of macroblocks to be set as intra macroblocks in the MBL in the manner described below.

$$k = (remainMB + remainPic[\mathrm{mod}(0, 4)] - 1) / remainPic[\mathrm{mod}(0, 4)]$$

$$= INT((5 + 2 - 1)/2) = 3$$

The intra MB determination unit 3 sets three macroblocks as intra macroblocks sequentially in order of smaller activity values. In FIG. 5C, the macroblock indicated by "3.1" has the smallest activity value, the macroblock indicted by "3.2" has the second smallest activity value, and the macroblock indicated by "3.3" has the third smallest activity value. Thus, the intra MB determination unit 3 sets the shaded macroblocks as intra macroblocks. Information about the macroblocks that have been set as intra macroblocks by the intra MB determination unit 3, which is information DET_IntraMB, is output to the inter-intra determination unit 4 and the coding unit 5.

Based on the information DET_IntraMB output from the intra MB determination unit 3, the inter-intra determination unit 4 calculates the cost for coding for each of the macroblocks remaining after the macroblocks set as intra macroblocks by the intra MB determination unit 3 are excluded, and determines whether each of the remaining macroblocks is to be set as an intra macroblock. The inter-intra determination unit 4 outputs information about the macroblock set as an intra macroblock, which is information DET2_IntraMB, to the intra MB determination unit 3 and the coding unit 5.

Based on the information DET2_IntraMB, the intra MB determination unit 3 sets the intra refresh completion flag for the macroblock set as an intra macroblock to prevent the macroblock from being set as an intra macroblock in the processing for subsequent frames.

In FIG. 5C, one hatched macroblock is the macroblock set as an intra macroblock by the inter-intra determination unit 4. Thus, the intra MB determination unit 3 sets the intra refresh completion flag for the three macroblocks "3.1" to "3.3" and the hatched macroblock set as an intra macroblock by the inter-intra determination unit, or four macroblocks in total, to prevent these macroblocks from being set as intra macroblocks in the processing for subsequent frames. As a result, the number of macroblocks remainMB of the MBL with h=0 that have yet to be set as intra macroblocks is "1," which is calculated as the number remainMB=5−4=1.

For the MBL with h=1 in the third frame in FIG. 5C, the same processing is performed as for the MBL with h=0 in the second frame.

For the MBL with h=2 in the third frame in FIG. 5C, the same processing is performed as for the MBL with h=0 in the first frame.

For the MBL with h=3 in the third frame in FIG. 5C, the same processing is performed as for the MBL with h=2 in the second frame.

Processing for the Fourth Frame (FIG. 5D)

In the processing for the fourth frame shown in FIG. 5D for the MBL with h=0, remainPic[mod(h, 4)]=1 and remainMB=1, and thus the intra MB determination unit calculates the number k of macroblocks to be set as intra macroblocks in the MBL in the manner described below.

$$k = (remainMB + remainPic[\mathrm{mod}(0, 4)] - 1) / remainPic[\mathrm{mod}(0, 4)]$$

$$= INT((1 + 1 - 1)/1) = 1$$

The intra MB determination unit 3 sets one macroblock as an intra macroblock in order of smaller activity values. In FIG. 5C, the macroblock indicated by "4.1" is set as an intra macroblock. Information about the macroblock that has been set as an intra macroblock by the intra MB determination unit 3, which is information DET_IntraMB, is output to the inter-intra determination unit 4 and the coding unit 5.

In the four frames corresponding to the cycle of the intra refresh process, all macroblocks of the MBL with h=0 are set as intra macroblocks.

For the MBL with h=1 in the fourth frame in FIG. 5D, the same processing is performed as for the MBL with h=0 in the third frame.

For the MBL with h=2 in the fourth frame in FIG. 5D, the same processing is performed as for the MBL with h=0 in the second frame.

For the MBL with h=3 in the fourth frame in FIG. 5D, the same processing is performed as for the MBL with h=0 in the fourth frame.

Through the above processing performed repeatedly, the intra refresh process is performed for the MBLs with h=0, 1, 2, and 3 in a manner that the intra refresh process is delayed for each of these different MBLs by a predetermined period of time (one frame in the above example). This effectively prevents a specific frame to have a large number of intra macroblocks.

The processing described above is performed by the intra MB determination unit 3. The information DET_IntraMB about the macroblocks that have been set as intra macroblocks by the intra MB determination unit 3 is then output to the inter-intra determination unit 4 and the coding unit 5.

As described with reference to FIG. 5, the inter-intra determination unit 4 performs a determination process for each macroblock that has yet to be set as an intra macroblock by the intra MB determination unit 3 based on the information DET_IntraMB for each macroblock that has been set as an intra macroblock by the intra MB determination unit 3. More specifically, the inter-intra determination unit 4 calculates the cost for coding for each macroblock that has yet to be set as an intra macroblock by the intra MB determination unit 3 based on a motion-compensated moving image signal ME_out, which is output from the coding unit 5, and determines whether the macroblock is to be set as an intra macroblock based on the calculated coding cost. The inter-intra determination unit 4 outputs information (DET2_IntraMB) indicating whether each macroblock is to be set as an intra macroblock to the intra MB determination unit 3 and the coding unit 5. The coding cost is calculated by a coding cost calculation method used by, for example, H.264.

The coding unit 5 performs an intra coding process or an inter coding process for each macroblock of every frame image (every picture) that is formed by the moving image signal Din based on the information (DET_IntraMB) about the setting of intra macroblocks by the intra MB determination unit 3 and the information (DET2_IntraMB) about the setting of intra macroblocks by the inter-intra determination unit 4. More specifically, the coding unit 5 performs an intra coding process for a macroblock that has been set as an intra macroblock based on the information DET_IntraMB or DET2_IntraMB, and performs an inter coding process for any other macroblock.

The signal resulting from the coding performed by the coding unit 5 is output from the coding unit 5 as a coded moving image signal Dout.

As described above, the moving image coding apparatus 1000 uses a plurality of MBLs as one group, and performs an intra refresh process for each MBL in the group in a manner that the intra refresh process is delayed for each MBL and the start timing (reset timing) and the processing timing are set differently for each MBL in the same group. The moving image coding apparatus 1000 sets macroblocks as intra macroblocks sequentially in order of smaller activity values, and performs the intra refresh process for each macroblock in a manner that all the macroblocks are set as intra macroblocks in one cycle of the intra refresh process. Thus, the moving image coding apparatus 1000 effectively prevents a specific frame from having a large number of intra macroblocks set using a large amount of code, or prevents a specific frame from having a large number of macroblocks having large activity values set using a large amount of code. This reduces the need to roughly quantize intra macroblocks of a specific frame. The moving image coding apparatus 1000 enables coding of moving images while reducing variations in the code amount of intra macroblocks per frame. The resulting decoded images (video), which are obtained by decoding the coded moving image signal coded by the moving image coding apparatus 1000, will have a high image quality.

Figure 7:
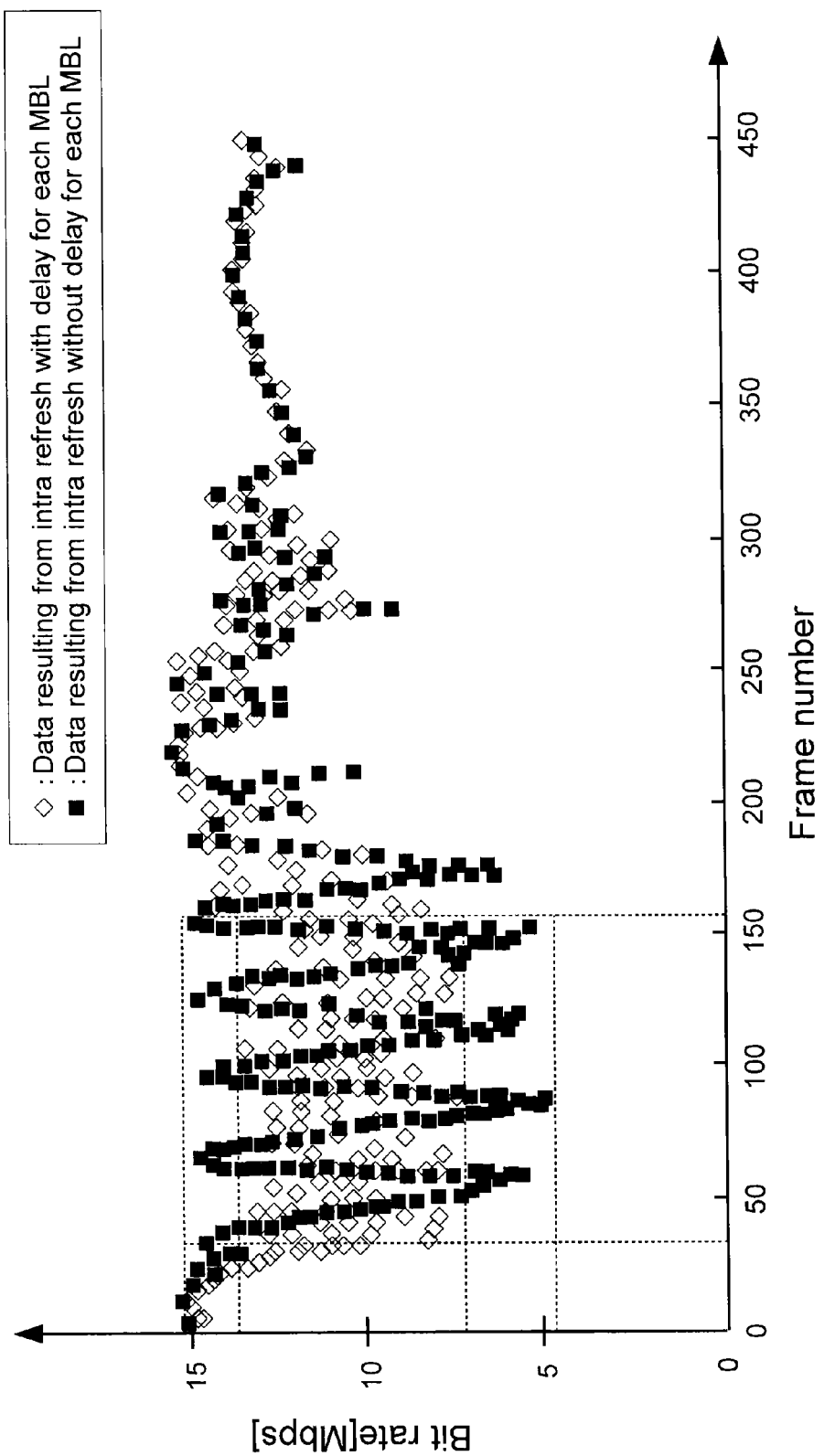
FIG. 7 shows a comparison of the bit rate of data coded by the moving image coding apparatus 1000 (the bit rate of a coded moving image signal by the apparatus 1000) and the bit rate of coded data (the bit rate of a coded moving image signal) resulting from the intra refresh process performed without changing (delaying) the timing at which the intra refresh process is started for each MBL.

FIG. 7 shows a comparison of (1) the bit rate of data (coded moving image signal) coded by the moving image coding apparatus 1000, or the bit rate of data (coded moving image signal, or data indicated by diamond shapes) resulting from the intra refresh process performed for each MBL with a different (delayed) start timing (reset timing) and (2) the bit rate of data (coded moving image signal, or data indicated by solid squares) resulting from the intra refresh process performed for each MBL with the same start timing (reset timing) (without delayed). In FIG. 7, the horizontal axis is the time axis, which indicates the time by using the frame number. In FIG. 7, the vertical axis indicates the bit rate in Mbps. The input moving image signal has a frame size of 1920 by 1080 pixels, a frame rate of 30 fps, and a cycle of 30 frames of the intra refresh process. Video formed by the input moving image signal is entirely complex and has its first half with less motions, and its second half involving panning of images and thus with more motions.

In the second half of the video, as shown in FIG. 7, (1) the bit rate of data (coded moving image signal) coded by the moving image coding apparatus 1000 (data resulting from the delayed intra refresh process) and (2) the bit rate of data (coded moving image signal) coded through the intra refresh process performed for each MBL without changing the start timing (without delaying), or data resulting from the intra refresh process without delay, differ from each other only slightly.

Conversely, in the first half of the video, or particularly in the video part consisting of frames roughly from the 40th to the 160th frame, (1) the bit rate of data (coded moving image signal) coded by the moving image coding apparatus 1000 (data obtained through the intra refresh process with delay) has small variations, and the data is coded more efficiently when compared with (2) the bit rate of data (coded moving image signal) coded through the intra refresh process performed without changing (delaying) the start timing for each MBL (data obtained through the intra refresh process with delay). In addition, the data obtained through the intra refresh process without delay includes a peak value of the bit rate for every 30 frames, which correspond to the cycle of the intra refresh process, whereas the bit rate of the data coded by the moving image coding apparatus 1000 (coded moving image signal) (data obtained through the intra refresh process with delay) has no such peak value of the bit rate for every 30 frames corresponding to the cycle of the intra refresh process. The bit rate of the data coded by the moving image coding apparatus 1000 has small variations per frame.

As described above, the moving image coding apparatus 1000 delays the intra refresh process for each MBL (delays the timing), and thus optimally reduces variations in the bit rate per frame. The moving image coding apparatus 1000 is particularly effective when processing complex videos with less motions.

1.3 Intra Refresh

Figure 6:
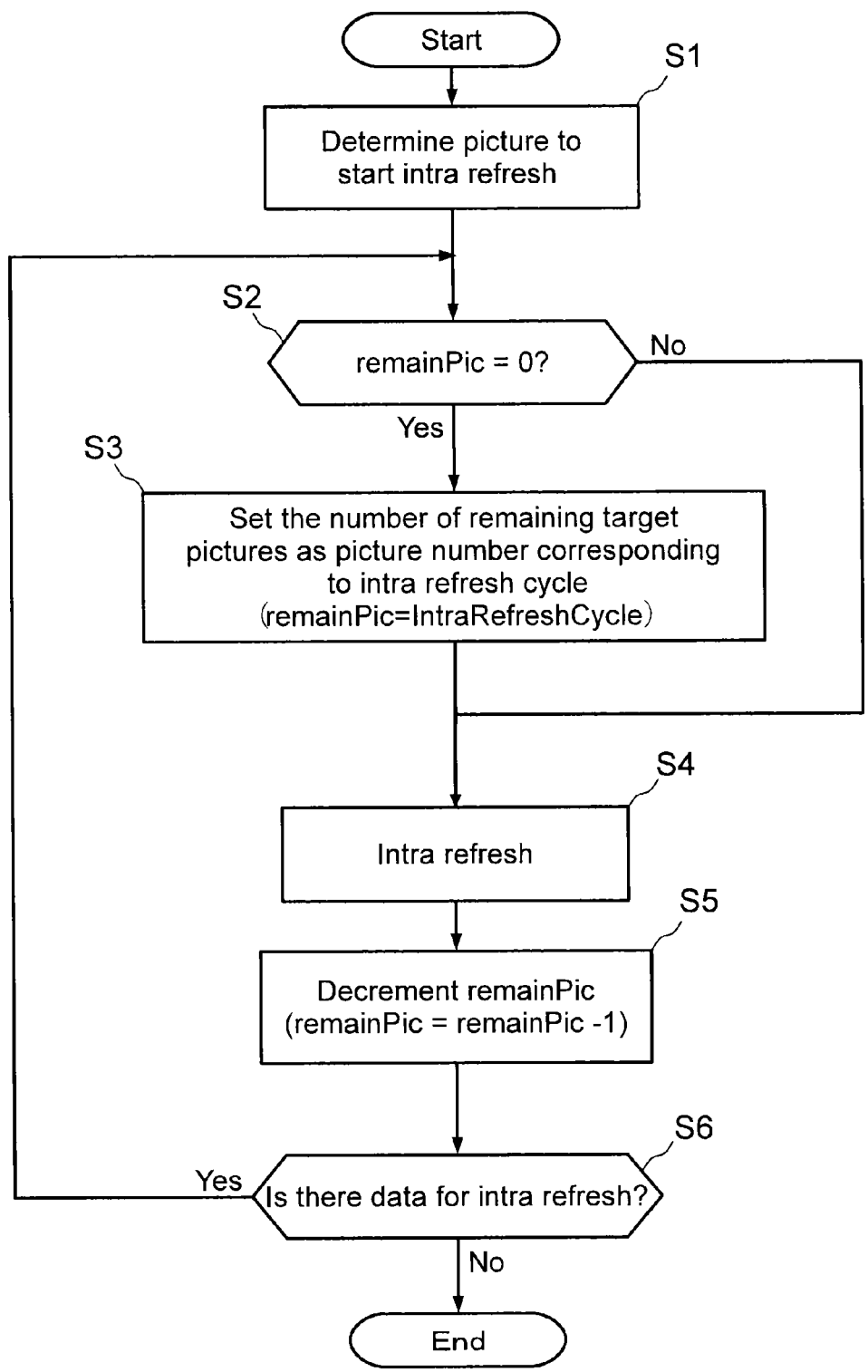
FIG. 6 is a flowchart illustrating the intra refresh process.

The method of intra refresh according to the present embodiment will now be described with reference to the flowchart of FIG. 6. The process described below may be performed by the moving image coding apparatus 1000, or may be performed by using a central processing unit (CPU), a read-only memory (ROM), or a random-access memory (RAM).

S1:

In step S1, a picture for which the intra refresh process is to be started is determined for each line number h of MBLs (for each MBL). More specifically, the delay time before the start timing of the intra refresh process (the reset timing of the intra refresh process) is obtained as the remaining picture number by using the formula below.

$$\mathrm{remainPic}[\mathrm{mod}(h,N)] = \mathrm{IntraRefreshCycle}/N \times \mathrm{mod}(h,N)$$

In the formula, mod(h, x) is a function to obtain a remainder returned by modulus x.

IntraRefreshCycle is the cycle (the number of frames) of the intra refresh process.

N is the number of MBLs in one group.

h is the line number of the MBL.

For integer arithmetic, it is preferable that the activity calculation unit 2 truncates or rounds off the value in the processing expressed by the above formula.

S2:

In step S2, the remaining picture number indicating the delay time before the start timing (reset timing) of the intra refresh process set for each line number h of MBLs (for each MBL) is monitored. When the remaining picture number is "0," the processing advances to step S3. When the remaining picture number is not "0," the processing advances to step S4.

S3:

When the remaining picture number is "0" in step S2, the remaining picture number remainPic[mod(h, N)] is set to the number of frames corresponding to the cycle of the intra refresh process in step S3.

S4:

In step S4, the intra refresh process is performed. More specifically, in the same manner as described with reference to FIGS. 3, 4, and 5A to 5D, k macroblocks are set as intra macroblocks for each MBL sequentially in order of smaller activity values among the macroblocks with no intra refresh completion flag being set. The number k is calculated by using the formula below.

$$k=(\text{remainMB}+\text{remainPic}[\text{mod}(h,N)]-1)/\text{remainPic}[\text{mod}(h,N)]$$

The intra refresh completion flag is set for the k macroblocks that have been set as intra macroblocks to prevent these macroblocks from being set as intra macroblocks in the processing for subsequent frames.

The cost for coding is calculated for each macroblock that has yet to be set as an intra macroblock by the coding cost calculation method used by, for example, H.264, and the intra refresh completion flag is set for each macroblock that has been set as an intra macroblock to prevent the macroblock from being set as an intra macroblock.

The processing described above is performed for one frame.

S5:

In step S5, the remaining picture number remainPic[mod(h, N)] is decreased by 1.

S6:

In step S6, the determination is performed as to whether there remains data to be subjected to the intra refresh process. When there remains data to be subjected to the intra refresh process, the processing returns to step S2, and the processing in step S2 and subsequent steps is performed. When there remains no data to be subjected to the intra refresh process, the processing ends.

As described above, the intra refresh method of the present embodiment uses a plurality of MBLs as one group, and performs the intra refresh process for each MBL in the group in a manner that the intra refresh process for each MBL is delayed and the start timing (reset timing) and the processing timing are set differently for each MBL in the same group. With the intra refresh method of the present embodiment, macroblocks are set as intra macroblocks sequentially in order of smaller activity values, and the intra refresh process for each macroblock is performed such that all the macroblocks are set as intra macroblocks in one cycle of the intra refresh process. Thus, the intra refresh method of the present embodiment effectively prevents a specific frame from having a large number of intra macroblocks set using a large amount of code, or prevents a specific frame from having a large number of macroblocks with large activity values set using a large amount of code. The intra refresh method of the present embodiment enables coding of moving images while reducing variations in the code amount of intra macroblocks per frame.

Other Embodiments

Although the above embodiment describes the case in which the cycle of the intra refresh process is 30 frames, the invention should not be limited to this structure. The cycle of the intra refresh process may be set to another value. The cycle of the intra refresh process performed by the moving image coding apparatus may be set (changed) by an external device.

Although the above embodiment determines the start timing of the intra refresh process for each MBL by using the remaining picture number, the invention should not be limited to this structure. The start timing of the intra refresh process for each MBL may be determined based on information about the temporal position of the current frame (present picture). For example, the start timing (reset timing) of the intra refresh process for each MBL may be determined by using the picture number (frame number) instead of the remaining picture number.

Some or all of the components of the moving image coding apparatus of the above embodiment may be formed using an integrated circuit (e.g., LSI or a system LSI).

All or part of the processes performed by the functional blocks described in the above embodiment may be implemented using programs. All or part of the processes performed by the functional blocks described in the above embodiment may be implemented by a CPU in a computer. The programs for these processes may be stored in a storage device, such as a hard disk or a ROM, and may be read into a ROM or a RAM and implemented.

The processes described in the above embodiment may be implemented by using either hardware or software (including use of an operating system (OS), middleware, or a predetermined library), or may be implemented using both software and hardware. When the moving image coding apparatus of the above embodiment is implemented by hardware, the moving image coding apparatus requires timing adjustment for their processes. For ease of explanation, the timing adjustment associated with various signals required in an actual hardware design is not described in detail in the above embodiment.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded. The computer readable recording medium may be, for example, a flexible disk, a hard disk, a CD-ROM, an MO, a DVD, a DVD-ROM, a DVD-RAM, a Blu-ray disc, or a semiconductor memory.

The computer program should not be limited to a computer program recorded on the recording medium, but may be a computer program transmitted with an electric communication line, a radio or cable communication line, or a network such as the Internet.

The specific structures described in the above embodiment are mere examples of the present invention, and may be changed and modified variously without departing from the scope and the spirit of the invention.

Appendixes

The present invention may also be expressed in the following forms.

A first aspect of the present invention provides a moving image coding apparatus for coding a moving image signal. The moving image coding apparatus includes a reset timing determination unit, an activity calculation unit, an intra MB determination unit, and a coding unit.

The reset-timing determination unit detects a temporal position of a current frame image, which is a frame image of a processing target, based on the moving image signal, and determines a reset timing at which an intra refresh process is reset for each line of macroblocks of the current frame image.

The activity calculation unit calculates an activity value indicating a complexity of an image for each macroblock of the current frame image based on the moving image signal.

The intra MB determination unit determines a macroblock to be set as an intra macroblock based on the activity value calculated by the activity calculation unit.

The coding unit codes the macroblock set as an intra macroblock by the intra MB determination unit through an intra coding process.

The reset-timing determination unit determines the reset timing at which the intra refresh process is reset (started) in a manner that the reset timing differs for each macroblock line.

The moving image coding apparatus determines the reset (start) timing at which the intra refresh process is reset (started) in a manner that the reset timing differs for each macroblock line, and thus prevents a single frame from having a large number of intra macroblocks set using a large amount of code and thus prevents a single frame from having an extremely large amount of code. This reduces the need to roughly quantize intra macroblocks of a single frame. The moving image coding apparatus enables coding of moving images with reduced deterioration in the image quality of the resulting decoded images (video), while reducing variations in the code amount of intra macroblocks per frame.

The intra refresh process is reset for each macroblock line to set all macroblocks in the macroblock line as the candidates for intra macroblocks.

A second aspect of the invention provides the moving image coding apparatus of the first aspect of the invention in which the reset-timing determination unit determines a timing at which the intra refresh process is performed in a manner that the intra refresh process is repeated in predetermined cycles.

The moving image coding apparatus repeats the intra refresh process for each macroblock line in predetermined cycles, and thus optimally prevents a specific frame from having a large amount of code.

A third aspect of the invention provides the moving image coding apparatus of the second aspect of the invention in which the reset-timing determination unit determines the timing at which the intra refresh process is performed in a manner that the intra refresh process is repeated for each macroblock line in the same cycle.

The moving image coding apparatus repeats the intra refresh process in the same cycle for each macroblock line, and thus enables the intra refresh process to be performed while maintaining the initial delay time (phase difference) between different macroblock lines. The moving image coding apparatus thus more optimally prevents a specific frame from having a large amount of code.

A fourth aspect of the invention provides the moving image coding apparatus of one of the first to third aspects of the invention in which the activity calculation unit calculates the activity value by using Hadamard transform.

The moving image coding apparatus, which calculates the activity value by using Hadamard transform, can calculate the activity value simply through integer arithmetic, and also obtains the complexity (activity value) of an image with a high precision by obtaining the frequency components of the image signal resulting from Hadamard transform.

A fifth aspect of the invention provides the moving image coding apparatus of one of the first to fourth aspects of the invention in which the intra MB determination unit sets macroblocks sequentially in order of smaller activity values as intra macroblocks in the macroblock line of the processing target.

The moving image coding apparatus sets macroblocks sequentially in order of smaller activity values, and thus enables efficient coding. The macroblocks with smaller activity values have smaller amounts of code. The above process thus prevents a single frame from having a larger amount of code. The moving image coding apparatus thus optimally prevents a specific frame from having a large amount of code.

A sixth aspect of the invention provides the moving image coding apparatus of one of the first to fifth aspects of the invention that further includes an inter-intra determination unit.

The inter-intra determination unit determines whether a macroblock that has yet to be set as an intra macroblock by the intra MB determination unit in the current frame image is to be set as an intra macroblock based on a motion compensated frame image. The motion compensated frame image is obtained through motion compensation performed by the coding unit using the current frame image and a frame image preceding the current frame image.

The coding unit performs an intra coding process for a macroblock that has been set as an intra macroblock by the intra MB determination unit and the inter-intra determination unit.

In this moving image coding apparatus, the intra MB determination unit calculates the cost for coding in accordance with, for example, H.264, for each macroblock that has yet to be set as an intra macroblock, and selects an optimum coding mode for the macroblock in terms of both the image quality and the code amount based on the calculated coding cost, and performs an inter coding process or an intra coding process for the macroblock. The moving image coding apparatus enables the coding process that achieves a high image quality and prevents the code amount from increasing for macroblocks that have yet to be set as intra macroblocks by the intra MB determination unit.

A seventh aspect of the invention provides the moving image coding apparatus of the sixth aspect of the invention in which the intra MB determination unit sets an intra macroblock setting completion flag for a macroblock that has been set as an intra macroblock in the current frame image to prevent the macroblock from being set as an intra macroblock in processing of subsequent frames, and sets an intra macroblock setting completion flag for a macroblock that has been set as an intra macroblock by the inter-intra determination unit. The intra MB determination unit sets, as intra macroblocks, macroblocks sequentially in order of smaller activity values among macroblocks with no intra macroblock setting completion flag being set in the current frame image.

The moving image coding apparatus prevents an intra macroblock that has once been set as an intra macroblock from being set as an intra macroblock again in one cycle of the intra refresh process, and thus prevents the image quality of the decoded images from deteriorating due to a specific macroblock repeatedly set as an intra macroblock.

An eighth aspect of the invention provides the moving image coding apparatus of one of the first to seventh aspects of the invention in which when h is a macroblock line number, N is the number of macroblock lines included in one group, and IntraRefreshCycle is the number of frames corresponding to a cycle of the intra refresh process, the reset-timing determination unit calculates the number of remaining frames before an intra fresh process for a macroblock with a macroblock line number h is reset by using the formula below:

$$remainPic[mod(h,N)]=INT(IntraRefreshCycle/N) \times mod(h,N)$$

where mod(h, X) is a function to obtain a remainder returned by modulus x, IntraRefreshCycle is the cycle of the intra refresh process, N is the number of MBLs in one group, and INT(x) is a function to obtain a maximum integer not exceeding x. The cycle of the intra refresh process is the number of frames. The reset-timing determination unit decrements the variable remainPic[mod(h, N)] by 1, and stores the decremented variable remainPic[mod(h, N)].

The intra MB determination unit sets the reset timing (start timing) of the intra fresh process for a macroblock line with the macroblock line number h as a timing at which the variable remainPic[mod(h, N)] reaches 0.

The moving image coding apparatus performs the intra refresh process for each macroblock line in one group with substantially the same delay time (phase difference) before the reset (start) of the intra refresh process. This enables macroblocks set as intra macroblocks to be scattered in an appropriate manner. As a result, the moving image coding apparatus enables coding of moving images with reduced deterioration in the image quality of decoded images (video), while reducing variations in the code amount of intra macroblocks per frame.

A ninth aspect of the invention provides the moving image coding apparatus of one of the first to eighth aspects of the invention in which when h is a macroblock line number, N is the number of macroblock lines included in one group, remainMB is the number of macroblocks that have yet to be set as intra macroblocks in one cycle of the intra refresh process, and remainPic is the number of remaining frames in the macroblock line before one cycle of the intra refresh process completes, the intra MB determination unit sets k macroblocks in the macroblock line sequentially in order of smaller activity values as intra macroblocks based on the number k calculated by the following formula:

$$k=INT((remainMB+remainPic-1)/remainPic)$$

where N is the number of MBLs included in one group, h is a line number of each MBL, and INT(x) is a function to obtain a maximum integer not exceeding x.

The moving image coding apparatus adjusts the number of macroblocks set as intra macroblocks in the remaining frames in a balanced manner, and ensures that all the macroblocks are set as intra macroblocks within one cycle of the intra refresh process. Thus, the moving image coding apparatus enables coding of moving images with reduced deterioration in the image quality of the decoded images (video), while reducing variations in the code amount of intra macroblocks per frame.

A tenth aspect of the invention provides a moving image coding method for coding a moving image signal. The method includes an intra refresh process start timing determination step, an activity calculation step, an intra MB determination step, and a coding step.

In the intra refresh process start timing determination step, a temporal position of a current frame image, which is a frame image of a processing target, is detected based on the moving image signal, and a reset timing of an intra refresh process is determined for each line of macroblocks of the current frame image.

In the activity calculation step, an activity value indicating a complexity of an image is calculated for each macroblock of the current frame image.

In the intra MB determination step, a macroblock to be set as an intra macroblock is determined based on the activity value calculated in the activity calculation step.

In the coding step, the macroblock set as an intra macroblock in the intra MB determination step is coded through an intra coding process.

In the reset-timing determination step, the reset timing at which the intra refresh process is reset (started) is determined in a manner that the reset timing differs for each macroblock line.

The moving image coding method has the same advantageous effects as the moving image coding apparatus of the first aspect of the present invention.

An eleventh aspect of the invention provides an integrated circuit for coding a moving image signal. The integrated circuit includes a rest timing determination unit, an activity calculation unit, an intra MB determination unit, and a coding unit.

The reset-timing determination unit detects a temporal position of a current frame image, which is a frame image of a processing target, based on the moving image signal, and determines a reset timing of an intra refresh process for each line of macroblocks of the current frame image.

The activity calculation unit calculates an activity value indicating a complexity of an image for each macroblock of the current frame image.

The intra MB determination unit determines a macroblock to be set as an intra macroblock based on the activity value calculated by the activity calculation unit.

The coding unit codes the macroblock set as an intra macroblock by the intra MB determination unit through an intra coding process.

The reset-timing determination unit determines the reset timing at which the intra refresh process is reset (started) in a manner that the reset timing differs for each macroblock line.

The integrated circuit has the same advantageous effects as the moving image coding apparatus of the first aspect of the present invention.

What is claimed is:

1. A moving image coding apparatus for coding a moving image signal, comprising:
    reset-timing determination circuitry configured to detect a temporal position of a current frame image based on the moving image signal, and determine a timing to start an intra refresh process for each line of macroblocks of the current frame image, the current frame image being a frame image of a processing target;
    activity calculation circuitry configured to calculate an activity value indicating a complexity of an image for each macroblock of the current frame image based on the moving image signal;
    intra MB determination circuitry configured to determine a macroblock to be set as an intra macroblock based on the activity value calculated by the activity calculation circuitry; and
    coding circuitry configured to code the macroblock set as an intra macroblock by the intra MB determination circuitry through an intra coding process,
    wherein the reset-timing determination circuitry determines the reset timing of the intra refresh process in a manner that the intra refresh process for a first macroblock line, which is a macroblock line included in the current frame image, starts at a first timing and the intra refresh process for a second macroblock line, which is a macroblock line included in the current frame image and is adjacent to the first macroblock line, starts from a second timing different from the first timing, and the reset timing of the intra refresh process is a timing to start the intra refresh process and is a timing at which all macroblocks included in the macroblock line are each set as candidates for the intra macroblock, the intra refresh process for performing each of the macroblock lines is performed using N frames (N is a natural number greater than or equal to two), which are included in a time period from the timing to start the intra refresh process to the timing to terminate the intra refresh process, and each of all macroblocks included in the macroblock line to be processed for the intra refresh process is processed through the intra coding process at least once during a time period from the timing to start the intra refresh process to the timing to terminate the intra refresh process.

2. The moving image coding apparatus according to claim 1, wherein the reset-timing determination circuitry determines a timing at which the intra refresh process is performed in a manner that the intra refresh process is repeated in predetermined cycles.

3. The moving image coding apparatus according to claim 2, wherein the reset-timing determination circuitry determines the timing at which the intra refresh process is performed in a manner that the intra refresh process is repeated for each macroblock line in the same cycle.

4. The moving image coding apparatus according to claim 1, wherein the activity calculation circuitry calculates the activity value by using Hadamard transform.

5. The moving image coding apparatus according to claim 1, wherein the intra MB determination circuitry sets macroblocks sequentially in order of smaller activity values as intra macroblocks in the macroblock line of the processing target.

6. The moving image coding apparatus according to claim 1, further comprising:
inter-intra determination circuitry configured to determine whether a macroblock that has yet to be set as an intra macroblock by the intra MB determination circuitry in the current frame image is to be set as an intra macroblock based on a motion compensated frame image, the motion compensated frame image being obtained through motion compensation performed by the coding circuitry using the current frame image and a frame image preceding the current frame image,
wherein the coding circuitry performs an intra coding process for a macroblock that has been set as an intra macroblock by the intra MB determination unit and the inter-intra determination circuitry.

7. The moving image coding apparatus according to claim 6, wherein the intra MB determination circuitry sets an intra macroblock setting completion flag for a macroblock that has been set as an intra macroblock in the current frame image to prevent the macroblock from being set as an intra macroblock in processing of subsequent frames, and sets an intra macroblock setting completion flag for a macroblock that has been set as an intra macroblock by the inter-intra determination circuitry, and
the intra MB determination circuitry sets, as intra macroblocks, macroblocks sequentially in order of smaller activity values among macroblocks with no intra macroblock setting completion flag being set in the current frame image.

8. The moving image coding apparatus according to claim 1, wherein when h is a macroblock line number, N is the number of macroblock lines included in one group, and IntraRefreshCycle is the number of frames corresponding to a cycle of the intra refresh process,
the reset-timing determination circuitry calculates the number of remaining frames before an intra fresh process for a macroblock with a macroblock line number h is reset by using the formula below:

$$\text{remainPic}[\text{mod}(h,N)]$$

$$=\text{INT}(\text{IntraRefreshCycle}/N)\times\text{mod}(h,N)$$

where mod(h, X) is a function to obtain a remainder returned by modulus x, IntraRefreshCycle is a cycle of the intra refresh process, N is the number of MBLs in one group, and INT(x) is a function to obtain a maximum integer not exceeding x, and the cycle of the intra refresh process is the number of frames, and the reset-timing determination circuitry decrements the variable remainPic[mod(h, N)] by 1, and stores the decremented variable remainPic[mod(h, N)], and the intra MB determination circuitry sets the reset timing at which the intra fresh process is reset for a macroblock line with the macroblock line number h as a timing at which the variable remainPic[mod(h, N)] reaches 0.

9. The moving image coding apparatus according to claim 1, wherein when h is a macroblock line number, N is the number of macroblock lines included in one group, remainMB is the number of macroblocks that have yet to be set as intra macroblocks in one cycle of the intra refresh process, and remainPic is the number of remaining frames in the macroblock line before one cycle of the intra refresh process completes, the intra MB determination circuitry sets k macroblocks in the macroblock line sequentially in order of smaller activity values as intra macroblocks based on the number k calculated by the following formula:

$$k=\text{INT}((\text{remainMB}+\text{remainPic}-1)/\text{remainPic})$$

where N is the number of MBLs included in one group, h is a line number of each MBL, and
INT(x) is a function to obtain a maximum integer not exceeding x.

10. A moving image coding method for coding a moving image signal, comprising:
detecting a temporal position of a current frame image based on the moving image signal, and determining a timing to start an intra refresh process is reset for each line of macroblocks of the current frame image, the current frame image being a frame image of a processing target;
calculating an activity value indicating a complexity of an image for each macroblock of the current frame image based on the moving image signal;
determining a macroblock to be set as an intra macroblock based on the activity value calculated in the step of calculating the activity value; and
coding the macroblock set as an intra macroblock in the step of determining the macroblock through an intra coding process,
wherein the step of determining the reset timing determines the reset timing of the intra refresh process in a manner that the intra refresh process for a first macroblock line, which is a macroblock line included in the current frame image, starts at a first timing and the intra refresh process for a second macroblock line, which is a macroblock line included in the current frame image and is adjacent to the first macroblock line, starts at a second timing different from the first timing, and the reset timing of the intra refresh process is a timing to start the intra refresh process and is a timing at which all macroblocks included in the macroblock line are each set as candidates for the intra macroblock, the intra refresh process for performing each of the macroblock lines is performed using N frames (N is a natural number greater than or equal to two), which are included in a time period from the timing to start the intra refresh process to the timing to terminate the intra refresh process, and each of all macroblocks included in the macroblock line to be processed for the intra refresh process is processed through the intra coding process at least once during a time period from the timing to start the intra refresh process to the timing to terminate the intra refresh process.

11. An integrated circuit for coding a moving image signal, comprising:

reset-timing determination circuitry configured to detect a temporal position of a current frame image based on the moving image signal, and determine a timing to start an intra refresh process is reset for each line of macroblocks of the current frame image, the current frame image being a frame image of a processing target;

activity calculation circuitry configured to calculate an activity value indicating a complexity of an image for each macroblock of the current frame image;

intra MB determination circuitry configured to determine a macroblock to be set as an intra macroblock based on the activity value calculated by the activity calculation circuitry; and coding circuitry configured to code the macroblock set as an intra macroblock by the intra MB determination circuitry through an intra coding process, wherein the reset-timing determination circuitry determines the reset timing at which the intra refresh process is reset in a manner that the intra refresh process for a first macroblock line, which is a macroblock line included in the current frame image, starts at a first timing and the intra refresh process for a second macroblock line, which is a macroblock line included in the current frame image and is adjacent to the first macroblock line, starts from a second timing different from the first timing, and the reset timing of the intra refresh process is a timing to start the intra refresh process and is a timing at which all macroblocks included in the macroblock line are each set as candidates for the intra macroblock, the intra refresh process for performing each of the macroblock lines is performed using N frames (N is a natural number greater than or equal to two), which are included in a time period from the timing to start the intra refresh process to the timing to terminate the intra refresh process, and each of all macroblocks included in the macroblock line to be processed for the intra refresh process is processed through the intra coding process at least once during a time period from the timing to start the intra refresh process to the timing to terminate the intra refresh process.

* * * * *